Feb. 24, 1959 J. SANDIN ET AL 2,875,382

TIME DELAY DEVICES FOR CIRCUIT INTERRUPTERS

Filed Feb. 18, 1957 2 Sheets-Sheet 1

WITNESSES
Leon J. Taza
James T. Young

INVENTORS
Emor O. Shepard and
Jerome Sandin
BY
Francis V. B. Giolma
ATTORNEY

Feb. 24, 1959 J. SANDIN ET AL 2,875,382
TIME DELAY DEVICES FOR CIRCUIT INTERRUPTERS
Filed Feb. 18, 1957 2 Sheets-Sheet 2

2,875,382
Patented Feb. 24, 1959

2,875,382

TIME DELAY DEVICES FOR CIRCUIT INTERRUPTERS

Jerome Sandin, Forest Hills, and Emor O. Shepard, Wilkins Township, Allegheny County, Pa., assignors to Westinghouse Electric Corporation, East Pittsburgh, Pa., a corporation of Pennsylvania Application February 18, 1957, Serial No. 640,880

8 Claims. (Cl. 317—36)

Our invention relates generally to time delay devices, and it has reference in particular to static time delay devices, such as may be used to trip circuit breakers or the like.

Generally stated, it is an object of our invention to provide a static time delay device having a plurality of different delay characteristics.

More specifically, it is an object of our invention to provide a static semiconductor delay device having instantaneous, short time delay, and long time delay characteristics at different levels of fault current.

It is also an object of our invention to provide, in a time delay device, for using a single direct current source for operating a plurality of delay circuits having different response levels.

Yet, another object of our invention is to provide, in a static delay device, for using Zener diodes as blocking devices for triggering delay circuits having different delay characteristics to effect tripping of a circuit breaker or the like at different times at different current levels.

An important object of our invention is to provide a simple and reliable static multi-response level time delay device for a circuit breaker.

Another important object of our invention is to provide an improved trip device for circuit breakers utilizing a plurality of Zener diodes for operating a plurality of delay circuits at different current levels.

Other objects will, in part, be obvious and will, in part, be explained hereinafter.

In practicing our invention according to one of its embodiments, a transistor flip-flop is utilized to effect energization of the trip coil of a circuit breaker. A current transformer is connected to a heater for effecting an unbalance in a bridge circuit to produce a signal for operating the flip-flop with a long-time delay characteristic. Short-time delay is obtained by utilizing an R-C delay circuit energized from the current transformer through a Zener diode which effects operation of the flip-flop a predetermined time after the current exceeds a level which is higher than that for initiating operation of the long-time delay. An instantaneous trip circuit connects the current transformer to effect operation of the flip-flop through a Zener diode which prevents operation of the flip-flop until the current exceeds a still higher value.

For a more complete understanding of the nature and scope of our invention, reference may be made to the following detailed description, which may be read in connection with the accompanying drawings, in which.

Figure 1:
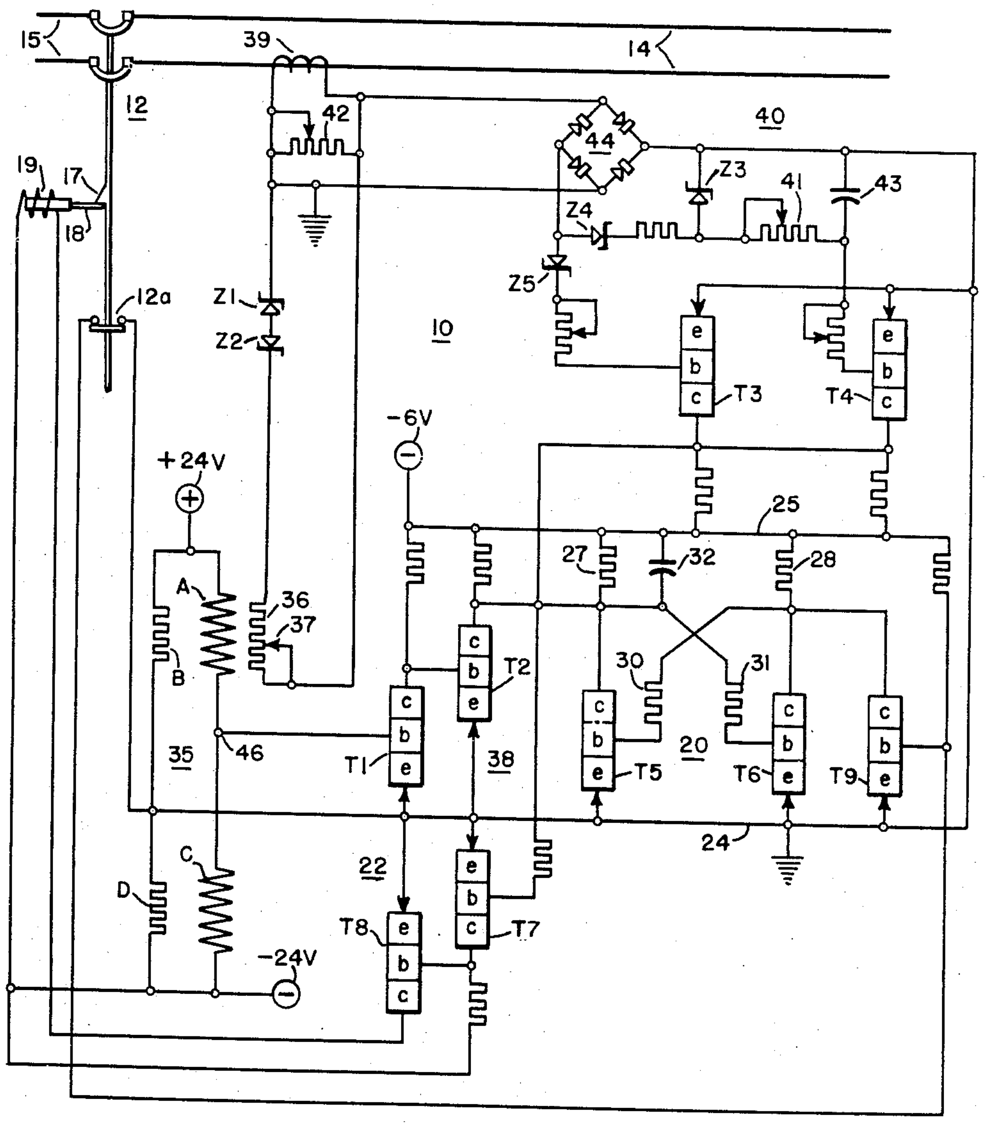
Fig. 1 is a schematic diagram of a trip circuit embodying the invention in one of its forms.
Figure 2:
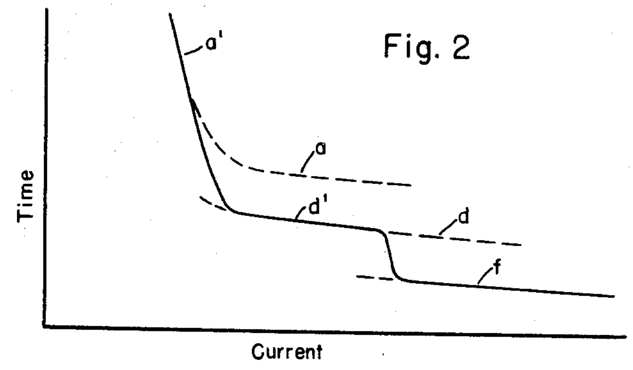
Fig. 2 shows a composite time current characteristic curve for the circuit of Fig. 1.
Figure 3:
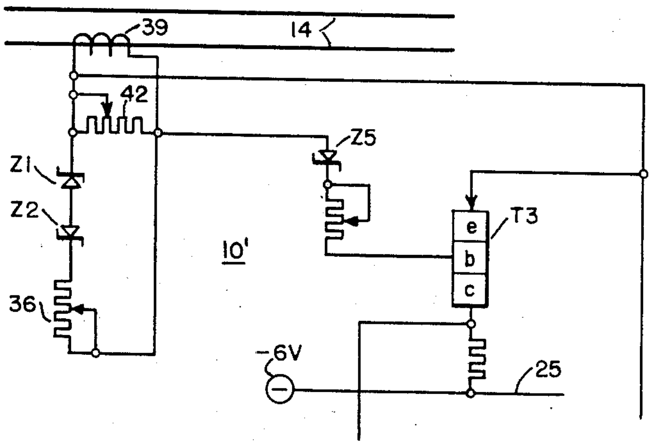
Fig. 3 is a partial schematic diagram of a modified form of the invention as shown in Fig. 1.

Referring to Fig. 1, the reference numeral 10 denotes generally a multi-delay characteristic trip circuit for effecting operation of a circuit breaker 12 to interrupt the circuit between source conductors 14 which are connected to a suitable alternating current source, and load circuit conductors 15, which may be connected to a suitable load or load circuit (not shown). The circuit breaker 12 may be of any type well known in the art and is shown schematically for the purposes of illustration as being latched in the closed position by means of a latch member 17 and a trip member 18, which may be released by means of a trip winding 19. In order to provide for energizing the trip winding 19, a flip-flop 20 is provided for applying a trip signal to the trip winding 19 through a transistor amplifier circuit 22.

The flip-flop 20 may comprise a pair of transistors T5, T6 having their emitters *e* connected to a common ground bus 24 connected to the center tap of a 48 volt source, while the collectors *c* thereof are connected through collector resistors 27 and 28, respectively, to a bus 25, which is connected to the minus 6-volt tap of the direct-current source. The transistors T5 and T6 are cross-connected, the base *b* of transistor T5 being connected to the collector *c* of transistor T6 through a resistor 30, while the base *b* of transistor T6 is similarly connected to the collector *c* of transistor T5 through a resistor 31. A capacitor 32 is connected in shunt with the resistor 27 so that the charging current thereof initially renders the transistor T6 saturated to place the flip-flop in a normal or off condition when power is first applied. The collector *c* of transistor T5 is connected to the base *b* of transistor T7 comprising the first stage of the amplifier 22, and since the emitter *e* of transistor T7 is also connected to bus 24, the transistor T5 functions to reduce the base current of the transistor T7 when the flip-flop 20 is triggered to the on condition. This effects saturation of the transistor T8, comprising a second section of the amplifier 22, thereby connecting the trip coil 19 to the bus 24 to be energized from the —24 volt terminal of the direct-current source.

Deenergization of the trip coil upon opening the breaker is effected by the opening of the shunting connection from the base *b* of transistor T9 to the conductor 24 through the breaker contacts 12a which open to provide base current for T9, which thus shunts transistor T6 and causes the flip-flop 20 to go to the off condition. This increases the base current of T7 and causes T8 to block and deenergize trip coil 19.

In order to provide for obtaining a relatively long-time delay tripping for the lower values of fault current, a bridge circuit 35 is provided comprising resistors A, B, C and D connected in a Wheatstone bridge circuit between the plus 24 volt and the minus 24 volt terminals of the source. Resistors A and C have a high negative temperature coefficient, while resistors B and D may be of any suitable type. Resistor A has a higher resistance than resistor C when both are at the same temperature. A heater 36 having an adjustable tap 37 is provided for heating the resistor A to produce an unbalance voltage across the bridge circuit 35, which is applied to the base *b* of a transistor T1 comprising the first stage of a not-not amplifier 38 which is connected to trigger the flip-flop 20. The heater 36 is connected to the secondary winding 39 of a current transformer connected in circuit with one of the conductors 14. An adjustable resistance 42 connected across the transformer varies the voltage drop for a particular value of current so as to determine the pick-up point. Zener diodes Z1, Z2 are connected in opposed relation between the heater 36 and the secondary winding 39 for preventing energization of the heater until the available voltage reaches the breakdown value of the silicon diodes which may, for example, have a breakdown voltage on the order of 5 volts. The transistor T1 has its base *b* connected intermediate the resistors A and C, while the bus 24 is connected to the emitter *e* and to a point intermediate the resistors B and D. The collector *c* of transformer T1 is connected to the bus 25 and to base *b* of transistor T2 so that the transistor T2 is normally cut off.

A short-time delay circuit 40 is provided in conjunction with a transistor T4 for triggering the flip-flop 20 after a short delay at current levels higher than that of the long-time delay circuit. The short-time delay circuit may comprise an R–C circuit of a resistor 41 and capacitor 43 connected to a rectifier bridge circuit 44 energized from the secondary winding 39 of the current transformers. Zener diodes Z4, Z3 may be connected in the circuit with the bridge circuit 44 and the delay circuit 40, so as to prevent energization of the delay circuit until the voltage of the secondary winding 40 reaches a somewhat higher value than that of the Zener diodes Z1 and Z2, and to limit the voltage of the bridge circuit. The Zener diodes Z3 and Z4 may have a breakdown voltage on the order of 20 volts, for example. A transistor T4 is connected across the capacitor 43 so as to saturate when the voltage of the capacitor 43 reaches a predetermined value, and trigger the flip-flop 20 to effect energization of the trip winding 19.

In order to provide for instantaneous tripping of the circuit breaker 12 at still higher values of fault current, such as under short-circuit conditions, for example, a Zener diode Z5 may be connected to the bridge circuit 44 for applying a control voltage to the base *b* of a transistor T3 connected in parallel with the transistor T4. For triggering the flip-flop 20 to the on condition at a predetermined short-circuit value of current, the Zener diode Z5 may, for example, have a breakdown voltage on the order of 40 volts.

Under normal load conditions, the voltage developed across the adjustable resistor 42 is less than the 5 volts, the breakdown voltage value of the Zener diodes Z1 and Z2. Accordingly, no current flows in the heater 36, transistor T1 is saturated and transistor T2 is cut off; the delay circuit 40 is not energized, and the transistor T3 remains cut off or blocked. The intermediate point 46 between resistors A and C will be negative with respect to the common ground bus 24 so that base current flows in the transistor T1 causing transistor T1 to saturate and transistor T2 to be cut off.

Upon the occurrence of an overload, the voltage across the resistor 42 increases, and when it exceeds 5 volts, the Zener diodes Z1 and Z2 break down so that current commences to flow in the heater 36. This results in an increase in the temperature of resistor A and a decrease in the resistance thereof so that the intermediate point 46 becomes less negative and reduces the base current of the transistor T1. The collector voltage of transistor T2 increases to a value which causes the flip-flop 20 to change state to the on condition, with transistor T5 saturated and transistor T6 cut off. This diverts the base current of transistor T7 causing it to cut off, and causing transistor T8 to saturate. The trip winding 19 is thereupon connected between the common ground bus 24 and the minus 24 volt terminal of the source to trip the circuit breaker after a relatively long time delay which is determined by the heating effect of the heater 36. The value of current at which the time delay will commence is determined by the adjustment of the resistor 42, while the time delay for a given value of overload is determined by adjustment of the contact 37 and the values of the resistors A and C.

Should the overload exceed a predetermined minimum value such that a shorter delay in tripping may be desirable, the voltage across the secondary winding 39 will become sufficient to cause breakdown of the diode Z4. Diode Z3 limits the maximum voltage that may be applied to time delay circuit, thus providing more constant time delay. Capacitor 43 will thereupon be charged at a rate determined by the setting of the resistor 41.

Since the base *b* of the transistor T4 is connected across the capacitor 43, the base current of transistor T4 is a function of the instantaneous voltage on the capacitor 43. As the base current increases, the collector voltage of transistor T4 rises until the state of the flip-flop 20 is changed after a time delay, which is less than that required for the long-time relay circuit to change the state of the flip-flop.

Should the current in the conductors 14 reach a higher value of overload than that necessary to cause operation of the short-time delay circuit 40, such as, for example, a short circuit value, the voltage of the secondary winding 39 will rise to the breakdown value of the Zener diode Z5. The base current of transistor T3 is thereupon increased, and the collector voltage of transistor T3 increases rapidly until it reaches a value sufficient to change the state of the flip-flop 20 and effect instantaneous tripping of the circuit breaker 12. The individual time delay circuits have characteristic curves similar to the curves *a*, *d* and *f*, and the overall time current characteristic of the delay circuit results in a composite curve comprising the solid line sections *a'*, *d'* and *f* which approximates the characteristic of direct series overcurrent trip attachments presently used on many low-voltage circuit breakers. Reset of the flip-flop is effected whenever the breaker trips, by the opening of contacts 12*a* which effects saturation of T9, to shunt T6 and return the flip-flop 20 to the off condition.

If it is desired to utilize a trip circuit 10' with the short-time delay circuit 40 omitted, the rectifier circuit 44 of Fig. 1 may also be omitted, and Zener diode Z5 may be used to connect the base *b* of transistor T3 directly to a secondary winding 39 of the current transformer. In this arrangement, the heater 36 functions in the manner hereinbefore described to effect operation of the long-time delay circuit, while the instantaneous trip transistor T3 is connected between the bus 25 and the common bus 24 in the same manner as hereinbefore described in connection with the circuit of Fig. 1 and responds only to the negative half cycles of primary current when the Zener diode Z5 breaks down for effecting operation of the flip-flop 20 through the connection described in connection with Fig. 1.

Figure 4:
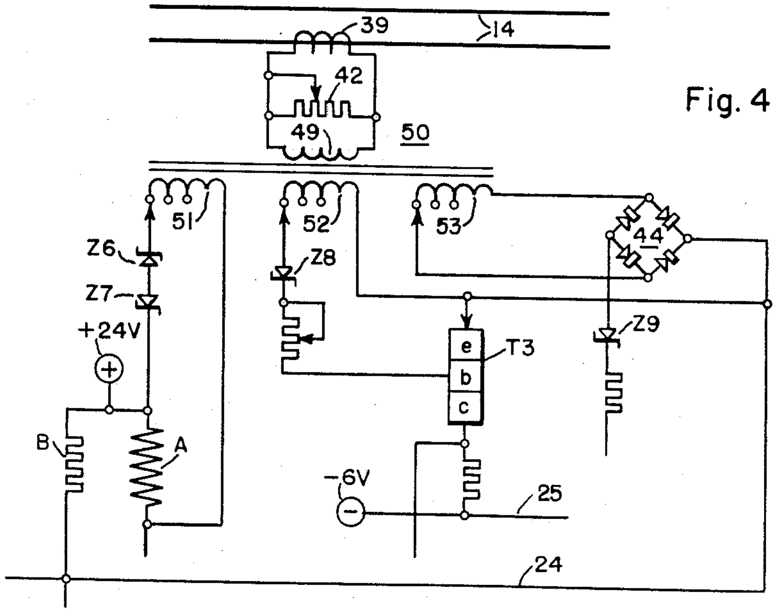
Fig. 4 is a partial schematic diagram of yet another modification of the invention, as shown in Fig. 1.

Referring to Fig. 4, it will be seen that the current transformer may have its secondary winding 39 connected to the primary winding 49 of an auxiliary transformer 50 having a plurality of tapped secondary windings 51, 52 and 53. The secondary winding 51 may be connected directly across the resistor A to produce the heating effect directly in the resistor, and Zener diodes Z6 and Z7 corresponding to the diodes Z1 and Z2 of Fig. 1, may be connected in circuit with the winding 51 and the resistor A having a 10-volt breakdown value. By making the winding 51 have twice as many turns as the winding 49, operation of the long-time delay circuit may be placed on the same level as that for the arrangement shown in Fig. 1. By utilizing a winding 52 having one-fourth of the turns of the winding 49, 10-volt Zener diode Z8 corresponding to diode Z5 of Fig. 1, may be used in connection with the instantaneous trip transistor T3, and by providing the winding 53 with half as many turns as the winding 49, another 10-volt Zener diode Z9 corresponding to Z4 of Fig. 1, may be used to connect the short-time delay circuit 40. In this manner, all of the Zener diodes have the same breakdown value, thus assisting in standardizing the circuit. In other respects, the circuit operates in the same manner as described in connection with Fig. 1 of the drawings. The tapped secondary windings may be used to adjust the pickup points of the several delay circuits.

From the above description and the accompanying drawings, it will be apparent that we have provided a static multi-delay trip circuit which has no moving parts and is reliable and effective in operation. The characteristics of the different circuit elements are readily adjustable to conform to the characteristics of fuses, cutouts, circuit breakers and other associated circuit devices with which the particular circuit breaker is adapted to cooperate.

Since certain changes may be made in the above-described construction and different embodiments of the invention may be made without departing from the spirit and scope thereof, it is intended that all the matter contained in the above description and shown in the accompanying drawings shall be considered as illustrative and not in a limiting sense.

We claim as our invention:

1. In combination, a circuit interrupter having electroresponsive means operable to open the breaker, switch means having a control electrode and operable to effect operation of the electroresponsive means, a plurality of delay circuits having different delay characteristics, current responsive means producing a voltage in accordance with the current in a circuit, and means including a plurality of Zener diodes having different breakdown voltages connecting the different delay circuits and the electroresponsive means to the current responsive means.

2. The combination with trip means for a circuit breaker of, a flip-flop having two stable states operable in one of said states to effect operation of the trip means, impedance means connected in circuit with said flip-flop to normally operate said flip-flop to the other of its states, means producing a voltage responsive to the current in a circuit, delay means operable to effect operation of the flip-flop to said one state, and a Zener diode connected between the current responsive means and the delay means to effect operation thereof a predetermined time after the current reaches a predetermined value.

3. In a control system for a circuit interrupter, means operable to open the interrupter, a flip-flop having two stable states operable in one of said states to effect operation of the opening means, a current transformer operable to produce a voltage in accordance with the current in a circuit, a plurality of circuits having different time characteristics, and means including a plurality of diodes having different voltage breakdown characteristics connecting different ones of the delay circuits to the current transformer.

4. A control system for a circuit breaker comprising, trip means operable to open the breaker, a flip-flop having two stable states and operable in one of them to effect operation of the trip means, means producing a voltage in accordance with the current in a circuit, a short-time delay circuit connected to effect operation of the flip-flop, a long-time delay circuit connected to effect operation of the flip-flop, a Zener diode having a predetermined breakdown voltage connected between the voltage producing means and the long-time delay circuit, and an additional Zener diode having a higher breakdown voltage connected between the voltage-producing means and the short-time delay circuit.

5. In a control circuit for a circuit breaker having a trip means operable to open the breaker, a flip-flop having two stable states operable in one of said states to effect operation of the trip means, current responsive means, a plurality of delay circuits having different delay characteristics connected to effect operation of the flip-flop to said one state, circuit means including a corresponding plurality of Zener diodes having different voltage breakdown values connecting the different delay circuits to the current responsive means, and means responsive to opening of the breaker to effect operation of the flip-flop to the other of its states.

6. In combination, a trip coil for a circuit breaker, a flip-flop having two stable states connected to effect energization of the trip coil in one of said states, means initially operating the flip-flop to the other of its states, a current transformer, thermoresponsive means energized from the current transformer operable to produce an output for effecting operation of the flip-flop to said one state after a predetermined delay, blocking means connected in circuit with the current transformer and the thermoresponsive means to prevent energization of the thermoresponsive means until the current transformer output reaches a predetermined level, means including a capacitor-resistance delay circuit connected to effect operation of the flip-flop to said one state with less than said predetermined delay, and blocking means connecting the capacitor resistance delay circuit to the current transformer to prevent energization thereof until the current transformer output reaches a predetermined higher level.

7. In combination, a circuit interrupter having electroresponsive means operable to open the interrupter, a flip-flop having two stable states operable in one of said states to connect the trip means to effect operation thereof, means producing a voltage in accordance with the current in a circuit, long-time delay means including a Wheatstone bridge circuit of impedance devices connected to apply an unbalance voltage to effect operation of the flip-flop to said one state, a heater arranged to heat one of said impedance devices and produce an unbalance voltage, means including a Zener diode connecting the heater to the current transformer and having a breakdown voltage to prevent energization of the heater until the current of the current responsive means exceeds a predetermined value, a resistor-capacitor delay circuit having a delay less than said long-time delay means connected to apply a voltage to effect operation of the flip-flop to said one state after such delay, means including a Zener diode having a breakdown value such as to connect the resistor-capacitor delay circuit to the transformer to effect energization thereof only if the current of the transformer exceeds a value greater than said predetermined value, and means including a Zener diode having a breakdown voltage corresponding to a current in excess of the second of the aforesaid values connecting the current transformer to the flip-flop.

8. The combination with a circuit breaker having trip means, of a flip-flop having two stable states operable in one of said states to connect the trip means to a source of electrical energy to effect operation thereof, means including a transformer having a plurality of secondary windings for producing different voltages in accordance with the current through the breaker, a long-time delay circuit connected to operate the flip-flop to said one state, a Zener diode having a predetermined breakdown voltage connecting the delay circuit to one of said windings, a short-time delay circuit connected to effect operation of the flip-flop to said one state, another Zener diode having the same breakdown voltage connected to a winding having a lower voltage, means for applying an instantaneous trip signal to the flip-flop, and means including another Zener diode having the same breakdown voltage connecting the instantaneous trip means to another of said windings.

References Cited in the file of this patent

UNITED STATES PATENTS

| | | |
|---|---|---|
| 2,548,818 | Rambo | Apr. 10, 1951 |
| 2,716,729 | Shockley | Aug. 30, 1955 |
| 2,751,549 | Chase | June 19, 1956 |
| 2,779,877 | Lehovec | Jan. 29, 1957 |